United States Patent [19]
Hook et al.

[11] 3,892,776

[45] July 1, 1975

[54] N-OXIDES OF BIS-BASIC TRICYCLIC ETHERS

[75] Inventors: Robert H. Hook; George J. Wright, both of Cincinnati, Ohio

[73] Assignee: Richardson-Merrell Inc., Wilton, Conn.

[22] Filed: Mar. 8, 1974

[21] Appl. No.: 449,227

[52] U.S. Cl...... 260/335; 260/247.7 F; 260/293.58; 260/293.62; 260/326.5 C; 260/380; 260/570.7; 424/248; 424/267; 424/274; 424/283; 424/330

[51] Int. Cl............................................. C07d 7/44

[58] Field of Search ... 260/247.7 F, 293.58, 293.62, 260/326.5 C, 335, 380, 570.7

[56] References Cited
UNITED STATES PATENTS

| | | | |
|---|---|---|---|
| 3,531,489 | 9/1970 | Albrecht et al. | 260/294.3 |
| 3,576,865 | 4/1971 | Fleming et al. | 260/559 |
| 3,592,819 | 7/1971 | Fleming et al. | 260/294.7 C |
| 3,647,860 | 3/1972 | Sill et al. | 260/275 FR |
| 3,707,471 | 12/1972 | Albrecht et al. | 260/293.62 |

OTHER PUBLICATIONS

Cram et al., "Organic Chemistry," 2nd Ed., McGraw-Hill, New York (1964), pp. 551–552.

Migrdichian, "Organic Synthesis," Vol. 1, Reinhold, New York (1957), p. 491.

*Primary Examiner*—G. Thomas Todd
*Attorney, Agent, or Firm*—William J. Stein; Eugene O. Retter; George W. Rauchfuss, Jr.

[57] ABSTRACT

Novel N-oxide derivatives of bis-basic tricyclic ethers, their preparation and use for the prevention and inhibition of virus infections.

8 Claims, No Drawings

N-OXIDES OF BIS-BASIC TRICYCLIC ETHERS

SUMMARY OF THE INVENTION

This invention relates to new derivatives of bis-basic ethers, to their method of preparation, compositions thereof and to their usefulness as pharmaceutical agents. More particularly, the compounds of the present invention are N-oxide derivatives of certain bis-basic tricyclic ethers which are useful antiviral agents. Still more particularly, the compounds of the present invention are represented by the following formula:

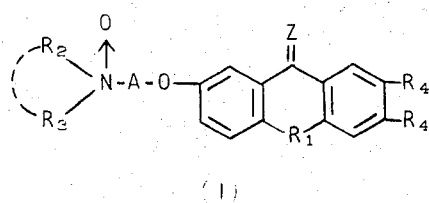

wherein Z is oxygen or $H_2$; $R_1$ is selected from the group consisting of a sigma bond, oxygen and when Z is oxygen, the carbonyl radical; A is the ethylene or trimethylene radical; $R_2$ and $R_3$ are each selected from the group consisting of lower alkyl having from 1 to 3 carbon atoms and when taken together with the nitrogen atom to which they are attached represent the pyrrolidinyl, piperidino and morpholino radicals; $R_4$ is selected from the group consisting of hydrogen and the radicals

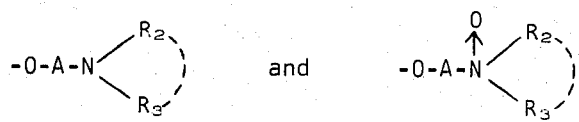

with the proviso that one and only one such $R_4$ group is hydrogen; and the pharmaceutically acceptable acid addition salts thereof.

In general the N-oxide derivatives herein described are prepared by reacting a bis-basic tricyclic ether with hydrogen peroxide or a peracid selected from the group consisting of peracetic, perbenzoic, monoperphthalic and m-chloroperbenzoic acids. This reaction can be schematically represented as follows:

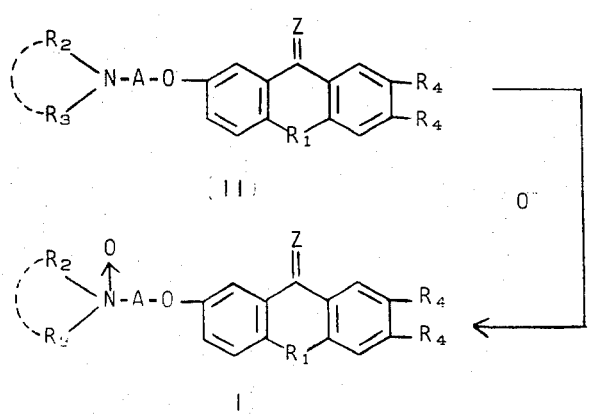

In the above reaction sequence the symbols A, Z, $R_1$, $R_2$, $R_3$ and $R_4$ have the values previously assigned.

In order to achieve an antiviral effect the novel compounds of this invention are administered to a suitable host using a variety of compositions. Such compositions may be administered either prior to infection as a prophylactic use or treatment, or they may be therapeutically administered subsequent to infection as a curative use or treatment. The compounds of this invention can be applied externally or topically directly at the situs of infection, or they may be administered internally or systemically irrespective of whether the treatment is prophylactic or curative in nature. In either event replication of the infectious virus is inhibited or prevented with the concomitant effect that the disease symptoms characteristic of the pathogenic virus infection are no longer present.

BACKGROUND OF THE INVENTION

There is a growing body of information that viruses play a vital role in a broad range of diseases, some of which represent the most serious of man's ills. Arthritis, juvenile arthritis, diabetes, Hodgkin's disease, and various immunological diseases and degenerative diseases of the central nervous system have been linked with viruses as the causative agents.

At present, the control of virus infections is primarily achieved by means of immunization vaccines. For example, poliomyelitis, smallpox, measles and influenza are well recognized diseases in which viral vaccines have proven effective. In general, however, viral vaccines have had only a moderate success in animal prophylaxis. Each vaccine acts primarily against a specific virus and is not heterophilic in the protection it offers. Hence, vaccines have not provided a practical solution against the wide array of infectious viruses, even where limited, as for example, to respiratory viruses alone.

One approach to the control of virus-related diseases, particularly to the spread of such virus diseases, has been to search for medicinal agents or chemotherapeutic agents which are capable of inhibiting the growth of viruses, thereby preventing the spread of disease and preventing further damage to cells and tissues of the animal host which have not as yet been infected. Heretofore, only a limited number of virus infections such as smallpox, Asian influenza, and herpes keratitis have been prevented by chemical antiviral agents. Sulfonamides and antibiotics, which have revolutionized the treatment of bacterial infections, have substantially no effect upon virus infections. A limited number of infections caused by large viruses, such as lymphogranuloma venereum, psittacosis and trachoma have been successfully treated using antibiotics and sulfa drugs. However, the majority of virus infections have not been responsive to attack by chemotherapeutic agents.

The bis-basic ethers of certain tricyclic nuclei have now been recognized to be useful antiviral agents for the treatment of viral infections in animals and man. Such compounds, however, show toxic side effects in animals which become more apparent with increasing dosages. Various structural modifications and derivatives of these bis-basic ethers have been attempted which would still possess the potent antiviral activity of the parent compounds without retaining their undesirable toxicity.

As a result of a long series of investigations, applicants have discovered that mild oxidation of certain of these bis-basic ethers results in the formation of a class of N-oxide derivatives which, surprisingly, retains, and in some instances actually surpasses, the excellent activity of the parent compounds. Even more surprising these derivatives are, in general, less toxic than their corresponding parent compounds. These N-oxide derivatives are effective against a wide spectrum of virus infections and are useful in treating such infections both prophylactically and therapeutically.

U.S. Pat. No. 3,592,819, copending application Ser. No. 303,255, filed Nov. 2, 1972, now issued as U.S. Pat. No. 3,829,578, and copending application Ser. No. 394,584, filed Sept. 5, 1973, whose counterpart has been published as Belgian Pat. No. 767,201 represent the closest art known to applicants and disclose the starting materials for the preparation of the compounds of the present invention. Applicants are not aware of any N-oxide derivatives of bis-basic tricyclic compounds which have heretofore been reported to possess antiviral activity.

DETAILED DESCRIPTION OF THE INVENTION

As can be seen from general formula (I) and its description above, the compounds of the present invention include the N-oxide derivatives of fluorene, xanthene or anthraquinone bis-basic ethers. However, all of the compounds of this invention share a community of common characteristics. Thus all of the compounds contain bis-basic ether side chains. These side chains can be regarded as consisting essentially of a bridging ether function located on the benzenoid portions of an aromatic nucleus, a basic tertiary amino group located at the terminal end of said side chain, and a two or three carbon unbranched alkylene chain which separates the bridging function from the terminal basic function. Additionally, these compounds are either mono or di-N-oxide derivatives which are prepared in the same manner and which possess the same utility.

When $R_1$ is a sigma bond, the N-oxides of 2,6- or 2,7-bis-basic ethers of fluorene and 2,6- or 2,7-bis-basic ethers of fluoren-9-one are delineated. The expression "sigma bond" is intended to refer to the ordinary single bond linkage between two adjacent carbon atoms resulting from the overlap of their corresponding orbitals. These compounds represent a preferred subgenus which can be represented by the following structure wherein the symbols Z, A, $R_2$, $R_3$ and $R_4$ have the values previously assigned.

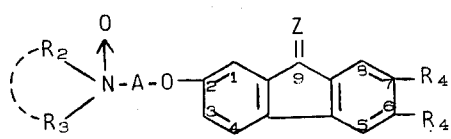

(III)

Illustrative of the N-oxide derivatives of the bis-basic fluorene ether type base compounds, represented by general formula (III) above, there can be mentioned: 2,6-bis[2-(dimethylamino)ethoxy]fluorene $N^2$-oxide, 2,6-bis[2-(piperidino)ethoxy]fluoren-9-one N,N-dioxide, 2,6-bis[3-(diisopropylamino)propoxy]fluoren-9-one $N^6$-oxide, 2,6-bis-[3-(diethylamino)propoxy]fluorene N,N-dioxide, 2,7-bis[2-(pyrrolidinyl)ethoxy]fluorene N,N-dioxide, 2,7-bis[2-(dipropylamino)ethoxy]fluoren-9-one N,N-dioxide, 2,7-bis-[3-(morpholino)propoxy]fluoren-9-one $N^2$-oxide and 2,7-bis[3-(diethylamino)propoxy]fluorene $N^7$-oxide.

When the symbol $R_1$ is oxygen, the N-oxides of 3,6- or 3,7-bis-basic ethers of xanthene and 3,6- or 3,7-bis-basic ethers of xanthene-9-one are delineated. These compounds can be represented by the following structure wherein the symbols Z, A, $R_2$, $R_3$ and $R_4$ have the values previously assigned.

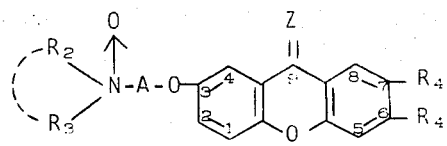

(IV)

Illustrative of the N-oxide derivatives of the bis-basic xanthene ether type base compounds, represented by general formual (IV) above, there can be mentioned: 3,6-bis[2-(diisopropylamino)ethoxy]xanthene N,N-dioxide, 3,6-bis[2-(morpholino)ethoxy]xanthen-9-one N,N-dioxide, 3,6-bis[3-(dimethylamino)propoxy]xanthen-9-one $N^3$-oxide, 3,6-bis [3-(pyrrolidinyl)propoxy]xanthene $N^6$-oxide, 3,7-bis[2-(diethylamino)ethoxy]xanthene N,N-dioxide, 3,7-bis[-2-(piperidino)ethoxy]xanthene $N^3$-oxide, 3,7-bis[3-(morpholino)-propoxy]xanthen-9-one N,N-dioxide, and 3,7-bis[3-(dipropylamino)propoxy]xanthen-9-one $N^7$-oxide.

The N-oxide derivatives of 2,6- or 2,7-bis-basic ethers of anthraquinone are also within the scope of the present invention. These compounds can be defined when the symbol $R_1$ represent the carbonyl radical, but only in the event that the symbol Z represent oxygen. Thus the 2,6- or 2,7-bis-basic ethers of anthracen-9-one or anthrone are not contemplated as within the scope of the present invention. The 2,6- or 2,7-bis-basic ether derivatives of anthraquinone can be structurally depicted as follows, wherein the symbols A, $R_2$, $R_3$ and $R_4$ have the values previously assigned.

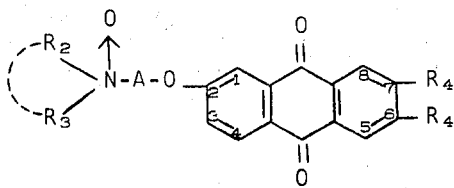

(V)

Illustrative of the N-oxide derivatives of the bis-basic anthraquinone ether type base compounds, represented by general formula (V) above, there can be mentioned: 2,6-bis[2-(diethylamino)ethoxy]anthraquinone N,N-dioxide, 2,6-bis[2-(piperidinyl)ethoxy]anthraquinone $N^2$-oxide, 2,6-bis-[3-(diisopropylamino)propoxy]anthraquinone $N^2$-oxide, 2,6-bis[3-(morpholino)propoxy)]anthraquinone N,N-dioxide, 2,7-bis[2-(morpholino)ethoxy]anthraquinone $N^7$-oxide, 2,7-bis[2-(dimethylamino)ethoxy]anthraquinone $N^7$-oxide, 2,7-bis[3-(pyrrolidinyl)propoxy]anthraquinone N,N-dioxide and 2,7-bis[3-(diethylamino)propoxy]anthraquinone N,N-dioxide.

The alkylene chain, represented by the symbol A, which separates the bridging ether group from the terminal basic side chain, consists of either a 2- or 3-membered carbon straight chain. These radicals may more properly be designated as the 1,2-ethanediyl or 1,3-propanediyl radicals according to the present rules of Chemical Abstract nomenclature. However, these groups have been termed as ethylene and trimethylene radicals throughout the instant application in accordance with the more generally recognized and understood former system of nomenclature. When the symbol A represents the ethylene radical, a preferred subgenus is formed.

The basic amino group located at the terminal end of each side chain must be a tertiary amine. In general this portion of the molecule can be represented by the radical

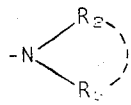

in which the symbols $R_2$ and $R_3$ represent a lower alkyl group having from 1 to 3 carbon atoms. The term lower alkyl refers to groups having from 1 to 3 carbon atoms. Illustrative of such groups are the methyl, ethyl, propyl and isopropyl radicals. Where $R_2$ and $R_3$ each represent lower alkyl, a preferred subgenus is formed.

The symbols $R_2$ and $R_3$ may also represent various saturated, monocyclic, heterocyclic radicals when taken in conjunction with the amine nitrogen atom to which they are attached. Typical of such heterocyclic groups are the pyrrolidinyl, piperidino and morpholino radicals. Compounds containing such groups are readily prepared and typify saturated, monocyclic, heterocyclic radicals which are generally useful in lieu of the dilower alkylamino groups present in the compounds of this invention.

The symbols $R_4$ refer to the bis-portion of the basic ether side chain. It should be noted that there can be one and only one such radical present, i.e., one of the $R_4$ groups must always be hydrogen. The tris-basic ethers are not within the scope of the present invention. Nevertheless, the bis-basic ether side chains may be in one of two isomeric positions. Thus in the fluorene series the basic ether side chains are located in either the 2,6- or the 2,7-positions. In the xanthene series these side chains are located in either the 3,6- or the 3,7-positions, and in the anthraquinone series they are in either the 2,6- or 2,7-positions.

The expression "pharmaceutically acceptable acid addition salts" refers to any organic or inorganic acid addition salts of the base compounds of formula (I) which are non-toxic in nature. In general these salts are crystalline materials which, in comparison to their free base forms, demonstrate higher melting points and exhibit an increased stability. Illustrative inorganic acids which form suitable salts include hydrochloric, hydrobromic, sulfuric and phosphoric acids and acid metal salts such as sodium monohydrogen orthophosphate and potassium hydrogen sulfate. Illustrative organic acids which form suitable salts are the mono, di and tricarboxylic acids, as for example, acetic, propionic, glycolic, lactic, pyruvic, malonic, succinic, glutaric, fumaric, malic, tartaric, citric, maleic, hydroxymaleic, benzoic, p-hydroxybenzoic, phenylacetic, cinnamic, salicylic, 2-phenoxybenzoic, or the sulfonic acids such as methanesulfonic acid and 2-hydroxyethanesulfonic acid. Either the mono or the di-acid salts may be formed. The N-oxides of the present invention readily form hydrates in varying degrees depending upon the amount of water present and their method of isolation. Although not technically a salt in nature, these hydrates are also contemplated to be within the scope of the expression "pharmaceutically acceptable acid addition salts" as used herein.

The N-oxide starting materials are all found described in the prior art. U.S. Pat. No. 3,592,819 describes the preparation of the fluorene and 9-fluorenone bis-basic ethers. Copending application Ser. No. 303,255, filed Nov. 2, 1972, now issued as U.S. Pat. No. 3,829,578 describes the preparation of the various xanthene and xanthen-9-one bis-basic ethers. The bis-basic ethers of anthraquinone are fully described in copending application Ser. No. 394,584, filed Sept. 5, 1973, whose counterpart has been published as Belgian Pat. No. 767,201.

The novel N-oxides of the present invention are prepared by the mild oxidation, in solution, of a bis-(tertiary)basic ether of fluorene, xanthene or anthraquinone, as illustrated by general formula (II) above with its reaction sequence. In general, bis-basic amines are more resistant to oxidation in acid solutions by virtue of the stabilizing effect of their salt formation. However, the bis-basic tertiary amines can be oxidized in both alkaline as well as acid solutions by means of suitable oxidizing agents to form the corresponding amine oxides (i.e., N-oxides). Suitable oxidizing agents include hydrogen peroxide and various peracids such as peracetic, perbenzoic, monoperphthalic and m-chloroperbenzoic acids. Additionally, the oxidation of the bis-basic ethers can be conducted in the presence of calcium hypochlorite in a dioxane/water solvent system or with organic hydroperoxides, such as tertiary butylhydroperoxide using a benzene solvent in the presence of a heavy metal catalyst such as vanadium pentoxide. The reaction with peracetic acid or m-chloroperbenzoic acid is particularly useful since the reaction proceeds smoothly and is readily controllable.

The oxidation reaction is generally carried out in a suitable solvent such as water, methanol or ethanol in the case of a peroxide oxidation. Additionally, when hydrogen peroxide is utilized as the oxidizing agent the reaction solution is rendered slightly alkaline using a dilute solution of ammonia or sodium bicarbonate. In the case of a peracid type oxidation, acetic acid is the preferred solvent when the oxidizing reagent is peracetic acid. In the case of m-chloroperbenzoic acid the preferred solvents are chloroform and methylene dichloride.

The temperature at which the reaction takes place is not critical. Very low temperatures are preferably avoided wherein the reaction proceeds extremely slowly. On the other hand very high temperatures are avoided due to the hazards created in working with the peracids. Generally a temperature ranging from about room temperature to about 50°C. is utilized. The reaction period ranges from about 1 hour to about 3 days, depending, of course, upon the temperature at which the reaction is conducted. Preferably, as a matter of convenience, the peracid oxidations are conducted overnight at room temperature.

The N-oxides of the present invention are isolated by well known methods known to the art such as extraction, antisolvent precipitation, chromatography, etc. The N-oxides readily combine with water to form ammonium bases. These bases can be regarded as quaternary ammonium hydroxides due to the polar nature of the fifth valence of the nitrogen atom. This polar nature of the nitrogen atom undoubtedly accounts for the unusual solubility characteristics of these compounds. Whereas the bis-basic tricyclic ethers are, in general, insoluble in polar solvents as their free bases, the corresponding mono and/or di-N-oxides are extremely soluble in polar solvents. Due to their high water solubility, silica gel partition chromatography is particularly useful in isolating small quantities of pure material.

Various degrees of oxidation are possible ranging from mono-N-oxide formation to di-N-oxide formation, with various intermediate mixtures also being obtained. As the degree of oxidation increases, more and more of the di-N-oxides are formed. The oxidation reaction can be monitored by means of thin layer chromatography, using techniques known to those skilled in the art. The oxidation reaction is limited only by the stability of the starting material to oxidative degradation.

The compounds of the present invention are potent antiviral agents. Preferably they are administered to an animal host to prevent or inhibit viral infections. The term host refers to any viable biological material or intact animal including humans which is capable of inducing the formation of interferon and which serves as a support means for virus replication. The host can be of animal or mammalian origin. Illustratively such hosts include: birds, mice, rats, guinea pigs, gerbils, ferrets, dogs, cats, cows, horses and humans. Other viable biological materials, such as that used in the production of vaccines, may also act as a host. Thus, tissue cultures prepared from organ tissues, such as mammalian kidney or lung tissue, as well as tissue cultures prepared from embryo tissue, such as obtained from amniotic cells and chick allantoic fluid, have been found to be useful hosts.

The treatment of virus infections for purposes of the present invention encompasses both the prevention and the inhibition of characteristic disease symptoms in a mammalian host susceptible to invasion by a pathogenic virus. Illustrative of mammalian virus infections which can be prevented or inhibited by the administration of the compounds of the present invention are infections caused by picornaviruses, such as encephalomyocarditis virus; myxoviruses, such as the influenza $A_2$ (Jap/305) virus; arboviruses, such as Semliki forest virus; the herpes group of viruses, including herpes simplex; and the pox-viruses, as for example, vaccinia IHD. Thus, for example, the compounds of the present invention when administered orally or subcutaneously to mice in varying doses either shortly prior or subsequent to a fatal inoculation of a neurotropic virus such as encephalomyocarditis virus, having a $LD_{50}$ of from 5 to 50, delay or prevent completely the onset of death. Salts of these compounds of the present invention are generally administered in compositions containing a 0.15% aqueous hydroxyethylcellulose vehicle, whereas the free base compounds are generally administered in compositions containing a 10% aqueous surfactant vehicle in order to help solubilize the compound. In general, ten mice are used in each treated group with an additional 20 mice serving as a control group. At the time of administration the test virus is titrated in order to determine the potency or $LD_{50}$ for the particular virus pool used as a challenge. The control animals are given a placebo containing the identical volume of vehicle without, of course, the active ingredient. Because of the lethal nature of the test system employed, the antiviral nature of the test compound is dramatically illustrated with a side by side comparison of the treated surviving animals and the untreated control group of animals.

Respiratory viruses, such as influenza $A_2$ (Jap/305) virus, which are also lethal to the test animals employed, are administered via intranasal instillation. Animals infected in this manner have the active ingredients administered in the same manner as the test virus, and again a side by side comparison is made of the survivors of the animals treated with the untreated control animals.

Inexplicably, a mouse fatally infected with encephalomyocarditis of influenza virus occasionally survives without further treatment. This may be the result of a prior, interferon-induced infection in the mouse, or perhaps due to some genetic factor or other natural defense mechanism not presently understood. For this reason the control group selected is of sufficient size so as to statistically reduce to a negligible amount the influence of such a chance survivor upon the test results.

The vaccinia test virus is typical of the dermatotrophic type viruses which respond to treatment with compositions containing the compounds of the instant invention. The vaccinia virus generally produces a nonfatal infection in mice, producing characteristic tail lesions when the virus is subcutaneously administered to the tail of the mouse. The instant compounds are administered either orally or subcutaneously either prior to or subsequent to the vaccinia infection. Tail lesions are subjectively scored on the eighth day following infection against untreated animals, which serve as a control group. The compounds of the present invention have been found to be effective in varying degrees against one or all of these test viruses.

The mode of activity of the active ingredients of the present invention is not rigorously defined. Inter alia, the compounds of the present invention may induce the formation of interferon in a viable host. Interferon is a biological substance of unknown chemical structure, presumably proteinaceous in nature, which is produced by host cells in response to a viral infection. The interferon so produced acts on cells to induce the formation of a virus inhibiting substance, which inhibits in some yet unknown manner the intracellular replication of the virus without appearing to have any inactivation effect per se upon the virus. A few of the viruses susceptible to interferon replication inhibition are described in Horsfall and Tamm, "Viral and Rickettsial Infections of Man," 4th Edition (1965), J. B. Lippincott Company, pp. 328–9.

In addition to being potent antiviral agents in and of themselves, the N-oxide derivatives of this invention are, in general, less toxic than the corresponding parent compounds. Thus, for example, a single oral dosage of 26 milligrams per kilogram of the compound, 2,6-bis[2-diethylamino)ethoxy]anthraquinone is required to protect 50% of all mice challenged subcutaneously 24 hours after drug administration with 13 $LD_{50}$'s of Semliki Forest Virus and constitutes an effective dose ($ED_{50}$) under these conditions. Under essentially the same conditions a dosage of only 18 milligrams per kilogram is required for the di-N-oxide of this compound. In order to kill 50% of all mice ($LD_{50}$), during a seven day observation period, via a single oral administration requires a dosage of 1,560 milligrams per kilogram for the compound, 2,6-bis[2-(diethylamino)ethoxy]-anthraquinone. However, the corresponding di-N-oxide requires more than 4,000 milligrams per kilogram to effect lethality.

The therapeutic index for a given compound is an expression of the ratio of its $LD_{50}/ED_{50}$ under defined conditions. Expressed in terms of therapeutic index, the compound 2,6-bis[2-(diethylamino)ethoxy]anthraquinone has an oral therapeutic index of 60, whereas the 2,6-bis[2-(diethylamino)ethoxy]anthraquinone N,N-dioxide has an oral therapeutic index of over 222 in the virus system described.

As previously indicated, the compounds of the present invention may be prophylactically administered in order to prevent the spread of contagious viral diseases, or they may be therapeutically administered to a host already infected intended for their curative effect. When administered prophylactically, it is preferred that the administration be made within 0 to 96 hours prior to the infection of the host animal with a pathogenic virus. When the compounds of the present invention are administered for their curative effect, it is preferred that they be administered within about 1 or 2 days following infection of the host in order to obtain the maximum therapeutic effect.

The dosage administered will be dependent upon such parameters as the particular virus for which either treatment or prophylaxis is desired, the species of animal involved, its age, health, weight, the extent of infection, concurrent treatment, if any, frequency of treatment and the nature of the effect desired. A daily dose of the active ingredients will generally range from about 0.1 mg to about 500 mg per kg of body weight. Illustratively, dosage levels of the administered active ingredients for intravenous treatment range from about 0.1 mg to about 10 mg per kg of body weight; for intraperitoneal administration range from about 0.1 mg to about 50 mg per kg of body weight; for subcutaneous administration range from about 0.1 mg to about 250 mg per kg of body weight; for oral administration may be from about 0.1 mg to about 500 mg per kg of body weight; for intranasal instillation range from about 0.1 mg to about 10 mg per kg of body weight; and for aerosol inhalation therapy, the range is generally from about 0.1 mg to about 10 mg per kg of body weight.

Additionally the compounds of this invention are useful in suppressing responses of delayed hypersensitivity. Such responses frequently arise in response to infectious diseases, such as tuberculosis, streptococcal andstaphylococcal infections, typhoid fever and undulant fever; in response to the administration of toxoids and vaccines, particularly diphtheria toxoid and smallpox vaccination; contact skin hypersensitivity; tissue grafts and transplants; and autoimmune diseases such as rheumatoid arthritis, rheumatic fever, Addison's disease and Graves' disease.

The novel compounds described herein can also be administered in various different dosage unit forms, i.e., oral compositions such as tablets, capsules, dragees, lozenges, elixirs, emulsions, clear liquid solutions and suspensions; parenteral compositions such as intramuscular, intravenous or intradermal preparations; and topical compositions, such as lotions, creams or ointments. The amount of active ingredient contained in each dosage unit form will, of course, vary widely according to the particular dosage unit employed, the animal host being treated, and the nature of the treatment, i.e., whether prophylactic or therapeutic in nature. Thus, a particular dosage unit may contain from about 2.0 mg to over 3.0 g of active ingredient in addition to the pharmaceutical excipients contained therein.

The novel compounds described herein can be employed in conjunction or admixture with additional organic or inorganic pharmaceutical excipients. Suitable solid excipients include gelatin, lactose, starches, magnesium stearate and petrolatum. Suitable liquid excipients include water and alcohols such as ethanol, benzyl alcohol and polyethylene alcohols either with or without the addition of a surfactant. In general, the preferred liquid excipients particularly for injectable preparations, include water, saline solution, dextrose and glycol solutions, such as aqueous propylene glycol or an aqueous solution of polyethylene glycol. Liquid preparations to be used as sterile injectable solutions will ordinarily contain from about 0.5% to about 25% by weight, and preferably from about 1% to about 10% by weight, of the active ingredient in solution. In certain topical and parenteral preparations, various oils are utilized as carriers or excipients. Illustrative of such oils are mineral oils, glyceride oils such as lard oil, cod liver oil, peanut oil, sesame oil, corn oil and soybean oil.

A preferred method of administration for the compounds of the present invention is orally either in a solid dosage form such as a tablet or capsule, or in a liquid form such as an oral elixir, suspension, emulsion or syrup. Ordinarily, the active ingredient comprises from about 0.5% to about 10% by weight in an oral liquid composition. In such compositions, the pharmaceutical carrier is generally aqueous in nature, as for example, aromatic water, a sugar-based syrup or a pharmaceutical mucilage. For insoluble compounds, suspending agents may be added as well as agents to control viscosity, as for example, magnesium aluminum silicate or carboxymethylcellulose. Buffers, preservatives, emulsifying agents and other excipients can also be added.

For parenteral administration such as intramuscular, intravenous or subcutaneous administration, the proportion of active ingredient ranges from about 0.05% to about 20% by weight, and preferably from about 0.1% to about 10% by weight of the liquid composition. In order to minimize or eliminate irritation at the site of injection, such compositions may contain a nonionic surfactant having a hydrophile-lipophile balance (HLB) of about 12 to about 17. The quantity of surfactant in such formulations ranges from about 5% to about 15% by weight. The surfactant can be a single surfactant having the above-identified HLB, or a mixture of two or more components having the desired HLB. Illustrative of surfactants useful in parenteral formulations are the class of polyoxyethylene sorbitan fatty acid esters, as for example, sorbitan monooleate and the high molecular weight adducts of ethylene oxide with a hydrophobic base, formed by the condensation of propylene oxide with propylene glycol. The concentration of active ingredient contained in these various parenteral dosage unit forms varies over a broad range and comprises anywhere from about 0.05% to about 20% by weight of the total formulation, the remaining component or components consisting of liquid pharmaceutical excipients previously mentioned.

The active ingredients of the present invention can also be admixed directly with animal feeds or incorporated into the drinking water of animals. For most purposes, an amount of active ingredient is used which provides from about 0.0001% to about 0.1% and preferably, from about 0.001% to about 0.02% by weight of the active ingredient based upon the total weight of feed intake. The active ingredients can be admixed in animal feed concentrates suitable for use by farmers or livestock growers for incorporation in appropriate amounts with the final animal feeds. These concentrates ordinarily comprise from about 0.5% to about 95% by weight of the active ingredient compounded with a finely divided solid carrier or flour, such as wheat, corn, soybean or cottonseed flour. Depending upon the particular animal to be fed, nutrients and fillers may also be added such as ground cereal, charcoal, fuller's earth, oyster shells and finely divided attapulgite or bentonite.

The active ingredients of the present invention can be packaged in a suitable pressurized container together with an aqueous or volatile propellant for use as an aerosol. A suitable discharge valve is fitted to an opening in the container from which the active ingredients may be conveniently dispensed in the form of a spray, liquid, ointment or foam. Additional adjuvants such as co-solvents, wetting agents and bactericides may be employed as necessary. Normally, the propellant used is a liquified gaseous compound, preferably a mixture of low molecular weight fluorinated hydrocarbons. These haloalkanes are preferred because of their compatability with the active ingredients of the present invention, and because they are non-irritating when applied to skin surfaces. Other useful propellants include ethylene oxide, carbon dioxide, propane and nitrogen gas.

The invention described herein is more particularly illustrated by means of the following specific examples.

EXAMPLE 1

2,7-Bis[2-(diethylamino)ethoxy]fluoren-9-one $N^2$-oxide and N,N-dioxide

The compound, 2,7-bis[2-(diethylamino)ethoxy]-fluoren-9-one dihydrochloride, 10 milligrams, prepared in accordance with Example 1 of U.S. Pat. No. 3,592,819, is dissolved in 1 ml of distilled water, made alkaline, the free base extracted with a total of 10 ml of heptane, and evaporated to dryness under a stream of nitrogen. The resulting free base is dissolved in 3 ml of ethanol of which 2 ml is reacted with 0.2 ml of a 33% hydrogen peroxide solution. To the reaction mixture is added 0.2 ml of a 28% solution of ammonia and the reaction mixture is maintained at 37°C. for a period of 4 hours.

The reaction mixture, 10 microliters, is spotted on a 5 × 20 cm pre-coated Silica Gel $F_{254}$ thin layer chromatographic plate (E. Merck, 0.25 mm coating). The plate is developed with a solvent mixture consisting of chloroform: methanol: ammonium hydroxide in a ratio of 100:10:1 and examined under ultraviolet light. Comparison with known standards demonstrates the presence of unreacted 2,7-bis[2-(diethylamino)ethoxy]-fluoren-9-one, having an Rf value of 0.60, 2,7-bis[2-(diethylamino)ethoxy]fluoren-9-one $N^2$-oxide, having an Rf value of 0.20 and 2,7-bis[2-(diethylamino)ethoxy]fluoren-9-one N,N-dioxide, having an Rf value of 0.03.

In order to isolate the above products, larger volumes of the reaction mixture may be applied as a streak to a 20 × 20 cm Silica Gel $F_{254}$ chromatographic plate and chromatographed as described above. Those areas corresponding to the mono and di-N-oxides can be scraped from the plate and the active materials recovered therefrom. This technique is also useful in monitoring the oxidation reaction in order to obtain maximum yields of various mono or di-N-oxides.

EXAMPLE 2

2,7-Bis[2-(diethylamino)ethoxy]fluoren-9-one N,N-dioxide

The compound 2,7-bis[2-(diethylamino)ethoxy]-fluoren-9-one dihydrochloride, 50 gm (0.1 mole) is dissolved in approximately 1300 ml of water and excess sodium bicarbonate added with stirring. The mixture is extracted with three 100 ml portions of chloroform, the combined extracts dried over magnesium sulfate and the solvent removed under reduced pressure. The residual oil containing the free base compound is dissolved in 1 liter of acetic acid and 38 grams (about 2 equivalents) of a 40% peracetic acid solution added. The solution is stirred for 72 hours after which a peroxide test using starch-iodide paper proved to be negative. The reaction mixture is evaporated to an oil under reduced pressure, 50 ml of a saturated aqueous sodium bicarbonate solution is added, and the solution is evaporated to dryness at reduced pressure. The resulting solid is extracted with hot chloroform (3 × 100 ml), the extracts combined, dried over magnesium sulfate and evaporated to dryness under reduced pressure. The remaining crude oil is crystallized twice from an acetonitrile solution to yield 2,7-bis[2-(diethylamino)ethoxy]-fluoren-9-one N,N-dioxide as an orange-red trihydrate, having a m.p. of about 120° C. (dec.).

EXAMPLE 3

2,7-Bis[2-(dimethylamino)ethoxy]fluoren-9-one N,N-dioxide

A mixture of 19 grams of 2,7-bis[2-dimethylamino)ethoxy]fluoren-9-one dihydrochloride, prepared in accordance with Example 3 of U.S. Pat. No. 3,592,819, 15 grams of a 40% peracetic acid solution and 300 ml of acetic acid is stiirred at room temperature for 16 hours. The reaction mixture is heated on a steam bath for 30 minutes, 25 ml of triethylamine added and the resulting mixture heated for an additional 20 minutes on the steam bath. The reaction mixture is concentrated to a syrup, in vacuo, dissolved in 75 ml of water and neutralized with sodium bicarbonate. The water present is removed by evaporation in vacuo and the dry residue is recrystallized from acetonitrile to yield the compound, 2,7-bis[2-(dimethylamino)ethoxy]fluoren-9-one N,N-dioxide in the form of an orange diacetate hemihydrate salt having a m.p. 147–8°C. (dec.).

EXAMPLE 4

2,6-Bis[2-(diethylamino)ethoxy]anthraquinone N,N-dioxide

A mixture of 30 grams of 2,5-bis[2-(diethylamino)e- thoxy]anthraquinone dihydrochloride, prepared in accordance with Example 1 of Belgian Pat. No. 767,201, and 500 ml of a saturated sodium bicarbonate solution is extracted with two 300 ml portions of chloroform. The chloroform extracts are combined and percolated through a florisil column (4.5 × 10 cm) and the column is washed with an additional 200 ml of chloroform. The combined solvents are removed in vacuo and the free base residue is dissolved in 400 ml of acetic acid. A solution of 19.5 grams of 40% peracetic acid is added and the resulting mixture permitted to stand at room temperature overnight. Triethylamine, 1 ml, is added and the reaction mixture is heated on a steam bath for 10 minutes. (A negative test using potassium iodide-starch paper indicates all of the oxidizing agent is consumed). Excess acetic acid is removed by evaporation in vacuo and the residue is taken up in a concentrated sodium bicarbonate solution. The resulting mixture is extracted with five 200-ml portions of chloroform, the chloroform extracts combined, dried over anhydrous potassium carbonate and the solvent removed in vacuo. Benzene (500 ml) was added to the residue and the volatile components removed in vacuo. The resulting solid is recrystallized once from boiling benzene followed by a second recrystallization from acetonitrile to yield 2,6-bis[2-(diethylamino)ethoxy]anthraquinone N,N-dioxide in the form of a pale yellow diacetate monohydrate salt having a m.p. of 121°–2°C. (dec.).

Following essentially the same procedure but substituting the dihydrochloride salts of 2,6-bis[2-(diisopropylamino)ethoxy]anthraquinone, 2,6-bis[2-(pyrrolidinyl)ethoxy]anthraquinone and 2,7-bis [2-piperidino)ethoxy]anthraquinone for the 2,6-bis[2-(diethylamino)ethoxy]anthraquinone dihydrochloride above, results in the formation of 2,6-bis[2-(diisopropylamino)ethoxy]anthraquinone N,N-dioxide, 2,6-bis[2-(pyrrolidinyl)ethoxy]anthraquinone N,N-dioxide and 2,7-bis[2-(piperidino)ethoxy]anthraquinone N,N-dioxide as their diacetate salts, respectively.

EXAMPLE 5

3,6-Bis[2-(dimethylamino)ethoxy]xanthen-9-one N,N-dioxide

A mixture of 17 grams of 3,6-bis[2-dimethylamino)ethoxy]xanthen-9-one, prepared in accordance with Example 2 of copending Application Ser. No. 303,255, filed Nov. 2, 1972, now issued as U.S. Pat. No. 3,829,578, acetic acid (300 ml) and 14.8 grams of a 40% peracetic acid solution is stirred at room temperature for 16 hours. The reaction mixture is heated on a steam bath for a period of 30 minutes, triethylamine (25 ml) added, and the entire mixture is heated for an additional 30 minutes. The solvents are removed in vacuo and the residue crystallized from an acetonitrile-benzene mixture to yield 3,6-bis[2-(dimethylamino)ethoxy]xanthen-9-one N,N-dioxide diacetate as a while solid having a m.p. of 128°–30°C.

Following essentially the same procedure but substituting 3,6-bis[2-(piperidino)ethoxy]xanthen-9-one, 3,-6-bis[3-(dimethylamino)propoxy]xanthen-9-one and 3,7-bis-[2-(diethylamino)ethoxy]xanthene for the 3,6-bis[2-(dimethylamino)ethoxy]xanthen-9-one above, results in the formation of 3,6-bis[2-(piperidino)ethoxy]xanthen-9-one N,N-dioxide, 3,6-bis[3-(dimethylamino)propoxy]xanthen-9-one N,N-dioxide, 3,7-bis[2-(diethylamino)ethoxy]xanthene N,N-dioxide as their diacetate salts, respectively.

EXAMPLE 6

Illustration of the Antiviral Activities of 2,7-bis-[2-(diethylamino)ethoxy]fluoren-9-one N,N-dioxide Thirty mice weighing approximately 20 gms each are divided into two groups, a control group of 20 animals and a test group of 10 animals. All of the animals are challenged with a fatal dose (10 $LD_{50}$) of encephalomyocarditis virus. The test group of animals are tested both prophylactically and therapeutically using a parenteral composition containing 2,7-bis[2-(diethylamino)ethoxy]fluoren-9-one N,N-dioxide hydrate as the active ingredient dissolved in a solution of 0.15% aqueous hydroxyethylcellulose solution as the vehicle. The composition contains the active ingredient in an amount such that each dosage contains 0.25 ml which is equivalent to a dose level of 250 mg per kg. The control group receives a subcutaneous placebo containing the same volume of vehicle without the active ingredient. Observations over a 10 day period show the termination of all the control animals within a period of from 4 to 5 days, with the treated group surviving for a statistically longer period of time.

EXAMPLE 7

An illustrative preparation of 10,000 tablets, each containing 100 mg of 2,7-bis[2-(diethylamino)ethoxy]-fluoren-9-one N,N-dioxide hydrate is prepared as follows:

|  | Gm |
|---|---|
| 2,7-bis[2-(diethylamino)ethoxy]fluoren-9-one N,N-dioxide hydrate | 1000 |
| Lactose | 1000 |
| Starch paste (10% w/v starch in water) | 100 |
| Starch | 32.5 |
| Calcium stearate | 6.5 |

The active ingredient is uniformly mixed with the lactose and granulated by the addition of the starch paste. The granules which form are dried at 120°F. for 20 hours and forced through a No. 16 screen. The granules are lubricated by the addition of the starch and calcium stearate and compressed into tablets. Each tablet so prepared contains 100 mg of the active ingredient.

EXAMPLE 8

An illustrative composition for the preparation of 1000 two-piece hard gelatin capsules, each capsule containing 100 mg of 2,6-bis[2-(diethylamino)ethoxy]anthraquinone N,N-dioxide diacetate monohydrate is prepared as follows:

|  | Gm |
|---|---|
| 2,6-bis[2-(diethylamino)ethoxy]anthraquinone N,N-dioxide diacetate monohydrate | 100 |
| Corn starch | 150 |
| Magnesium stearate | 25 |
| 1000 hard gelatin capsules |  |

The finely powdered ingredients are mixed until uniformly dispersed and then filled into hard shelled gelatin capsules of the appropriate size.

In a similar fashion, soft gelatin capsules may be prepared in which the above composition can be granulated, slugged or directly compressed in a rotary die or plate mold in which the soft gelatin capsule is formed. Alternatively, the above excipients may be omitted and the active ingredient dispensed as a powder directly into the soft gelatin capsule.

EXAMPLE 9

A 2% weight per volume syrup of 2,7-bis[2-dimethylamino)ethoxy]fluoren-9-one N,N-dioxide diacetate hemihydrate is prepared by the usual pharmaceutical techniques in accordance with the following formula:

|  | Gms |
|---|---|
| Finely divided 2,7-bis[2-(dimethyl-amino)ethoxy]fluoren-9-one N,N-dioxide diacetate hemihydrate | 2.0 |
| Sucrose | 33.3 |
| Chloroform | 0.25 |
| Sodium benzoate | 0.4 |
| Methyl p-hydroxybenzoate | 0.02 |
| Vanillin | 0.04 |
| Glycerol | 1.5 |
| Purified water to 100.0 ml | |

EXAMPLE 10

One thousand grams of an ointment for topical application containing 1.0% of 3,6-bis[2-(dimethylamino)ethoxy]-xanthen-9-one N,N-dioxide diacetate is prepared from the following ingredients:

|  | Gms |
|---|---|
| 3,6-bis[2-(dimethylamino)ethoxy]xanthen-9-one N,N-dioxide diacetate | 10 |
| Light liquid petrolatum | 250 |
| Wool fat | 200 |
| White petrolatum q.s. ad | 1000 |

The wool fat, white petrolatum and 200 gms of the light liquid petrolatum are liquified and held at 110°F. The active ingredient is mixed with the remaining liquid petrolatum and passed through a colloid mill. After passing through the mill, the mixture is stirred into the melt, and the melt is permitted to cool with continued stirring until congealed.

EXAMPLE 11

An illustrative composition for an emulsion which is parenterally injectable is as follows:

| Each ml Contains | Ingredients | Amount |
|---|---|---|
| 50 mg | 2,7-bis[2-(diethylamino)-ethoxy]fluoren-9-one N,N-dioxide hydrate | 1.000 g |
| 100 mg | Polyoxyethylene sorbitan monooleate | 2.000 g |
| 0.0064 gm | Sodium chloride | 0.128 g |
|  | Water for injection, q.s. ad | 20.000 ml |

The parenteral composition is prepared by dissolving 0.64 g of sodium chloride in 100 ml of water suitable for injection. The polyoxyethylene sorbitan monooleate is mixed with the active ingredient, and an amount of the previously prepared aqueous sodium chloride solution added which is sufficient to bring the total volume to 20 ml. The resulting solution is shaken and autoclaved for 20 minutes at 110°C at 15 p.s.i.g. steam pressure. The composition can be dispensed in single ampule for use in multiple dosages or it can be dispensed as 10 or 20 individual ampules for use as a single dosage unit.

We claim:

1. An essentially pure N-oxide of a bis-basic tricyclic ether having the general formula

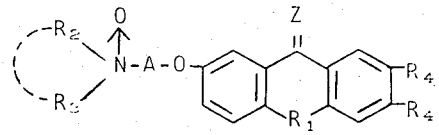

wherein

Z is oxygen or $H_2$;

$R_1$ is selected from the group consisting of a sigma bond, oxygen and when Z is oxygen the carbonyl radical;

A is the ethylene or trimethylene radical;

$R_2$ and $R_3$ are each selected from the group consisting of lower alkyl having from one to three carbon atoms and when taken together with the nitrogen atom to which they are attached represent the pyrrolidinyl, piperidino and morpholino radical;

$R_4$ is selected from the group consisting of hydrogen and the radicals

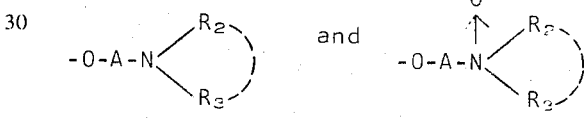

with the proviso that one and only one such $R_4$ group is hydrogen; and the pharmaceutically acceptable acid addition salts thereof.

2. A compound according to claim 1 in which A is the ethylene radical.

3. A compound according to claim 1 in which $R_4$ is the radical

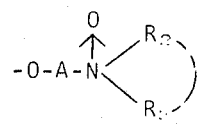

4. A compound according to claim 3 in which $R_1$ is a sigma bond.

5. A compound according to claim 3 in which $R_2$ and $R_3$ are each lower alkyl having from 1 to 3 carbon atoms.

6. A compound according to claim 1 which is 2,7-bis[2-(diethylamino)ethoxy]fluoren-9-one di-N-oxide and the pharmaceutically acceptable salts thereof.

7. A compound according to claim 1 which is 2,6-bis[2-(diethylamino)ethoxy]anthraquinone di-N-oxide and the pharmaceutically acceptable salts thereof.

8. A compound according to claim 1 which is 3,6-bis[2-(dimethylamino)ethoxy]-xanthen-9-one di-N-oxide and the pharmaceutically acceptable salts thereof.

* * * * *